US005550700A

United States Patent [19]

Moore et al.

[11] Patent Number: 5,550,700

[45] Date of Patent: Aug. 27, 1996

[54] INTERCHANGE CIRCUIT OVERLOAD PROTECTION USING DRIVER CURRENT LIMITING

[75] Inventors: Wayne T. Moore, Clearwater; John Scarmalis, St. Petersburg, both of Fla.

[73] Assignee: Lucent Technologies Inc., Murray Hill, N.J.

[21] Appl. No.: 320,147

[22] Filed: Oct. 7, 1994

[51] Int. Cl.$^6$ .......................... H02H 3/18

[52] U.S. Cl. .......................... 361/101; 361/87; 361/18; 340/870.39; 323/278

[58] Field of Search .......................... 361/18, 93, 100–101, 361/52, 87; 340/870.39; 307/31-35, 412, 116, 131; 379/412–413; 323/277–279

[56] References Cited

U.S. PATENT DOCUMENTS 4,254,372 3/1981 Moore, Jr. .......................... 323/277

4,800,331 1/1989 Vesce et al. .......................... 323/277

OTHER PUBLICATIONS

"Data Acquisition Databook", 1993 Edition, National Semi–Conductor Corporation, 2990 Semi–Conductor Drive, Santa Clara, California.

*Primary Examiner*—Jeffrey A. Gaffin
*Assistant Examiner*—Michael J. Sherry
*Attorney, Agent, or Firm*—Joseph J. Opalach

[57] ABSTRACT

A low-voltage drop current regulator regulates the current in a data interchange circuit. In one embodiment, the low-voltage drop current regulator couples a positive power supply voltage to the power supply pin of a driver integrated circuit. In another form of the invention, the low-voltage drop current regulator is placed in series with the individual output leads of a driver integrated circuit to couple the respective output signals to respective pins of the data interchange circuit.

3 Claims, 2 Drawing Sheets

INTERCHANGE CIRCUIT OVERLOAD PROTECTION USING DRIVER CURRENT LIMITING

BACKGROUND OF THE INVENTION

The present invention relates to data communications equipment and, more particularly, to overload protection circuitry on data interface leads.

Data communications equipment (DCE) interface to other peripheral equipment via data interface, or interchange, circuits, which are typically governed by industry standards. These interface circuits typically comprise a number of interface signals that are received by, and supplied from, the DCE. For example, in a DCE such as a Digital Service Unit (DSU), various industry standards such as RS-530, RS-449, and V.35, specify each interface signal according to function, pin placement, and electrical characteristics like operating voltage range, etc.

In the design of a DCE, commercially available integrated circuits are typically used to receive and supply the various interface signals. When supplying the interface signals, the DCE uses a "driver" integrated circuit (driver IC) to generate the output signals. The driver IC is designed by the respective integrated circuit manufacturer to conform to the specified electrical characteristics of a particular industry standard like those mentioned above. The output signals can either be differential, or single-ended, and appear on a number of output pins, or leads, of the DCE, which can then be coupled to an external peripheral either via a cable or via a backplane. However, when an interconnection is being made between a piece of peripheral equipment and a DCE, the danger always exists that a "short" may occur on one, or more, of the output pins. For example, there can be an external short either to ground or to the opposite leg of a differential output. Further, the driver IC includes a current limiter that typically passes more current than the power supply of the DCE is designed to handle. As a result, if a short occurs on one, or more, of these output leads, the potential exists for overloading—and damaging—the power supply of the DCE.

Unfortunately, simple resistive current-limiting cannot be used to protect the power supply of the DCE due to loaded versus unloaded output voltage constraints that are imposed by the above-mentioned standards on output signals. For example, insertion of a simple resistor in the output signal path, i.e., between a driver IC output pin and a load, sets up a voltage divider between this resistor and the load. Although this resistor may limit the current flow when a short occurs on the output pin of the driver IC, during normal operation the voltage drop across this resistor skews the operating voltage range of any output signal generated by the driver IC in such a way as to violate industry standards.

Lacking a simple solution, some manufacturers provide a power source that has a power rating higher than nominally required to take into account that one, or perhaps more, external leads will be shorted over the course of operation. This increase in power allows the power supply of the DCE to either supply more current than is required during normal operation, or to provide a significantly higher voltage than is required by the driver IC. In the latter case, instead of using a +5 volt power supply, a +10 volt power supply is used to provide power. The +10 volts is then regulated down by a series resistor and an integrated circuit voltage regulator, which supplies +5 volts to the driver IC. This configuration allows a significant voltage drop to occur across the series resistor, yet still provides enough input voltage to the voltage regulator, which then provides the required +5 V to the driver IC. However, both these approaches add cost to the design of the DCE. To avoid this additional cost, other manufacturers may simply not guarantee operation of their equipment if an external short should ever occur.

SUMMARY OF THE INVENTION

We have realized a solution to the above problem that allows a DCE to use a power supply that is nominally required—yet provides protection if one, or more, external shorts should occur on an output lead and allows the output signals to conform to industry standards. In particular, our solution is to provide a low-voltage drop current regulator which may be placed in series with the supply voltage to a driver, or, in series with the individual output leads of the driver, either of which satisfies the output voltage requirements as well as respective power-supply requirements of the driver.

In one embodiment of the invention, an RS-422 differential driver is supplied with power through a series-current regulator which limits the current to typical values, and drops no more than 0.5 volts.

In another embodiment of the invention, a single-ended RS-423 driver employs a series regulator on individual output leads to limit positive-supply current. In addition, since the RS-423 driver generates a bi-polar signal there is a resistor in series with a commercial negative regulator. This resistor limits the current range over which the negative regulator operates.

As a result, the inventive concept allows use of a power supply that is rated considerably lower, and costs less, than that which would be required to support one or more externally shorted output leads.

DETAILED DESCRIPTION

Figure 1:
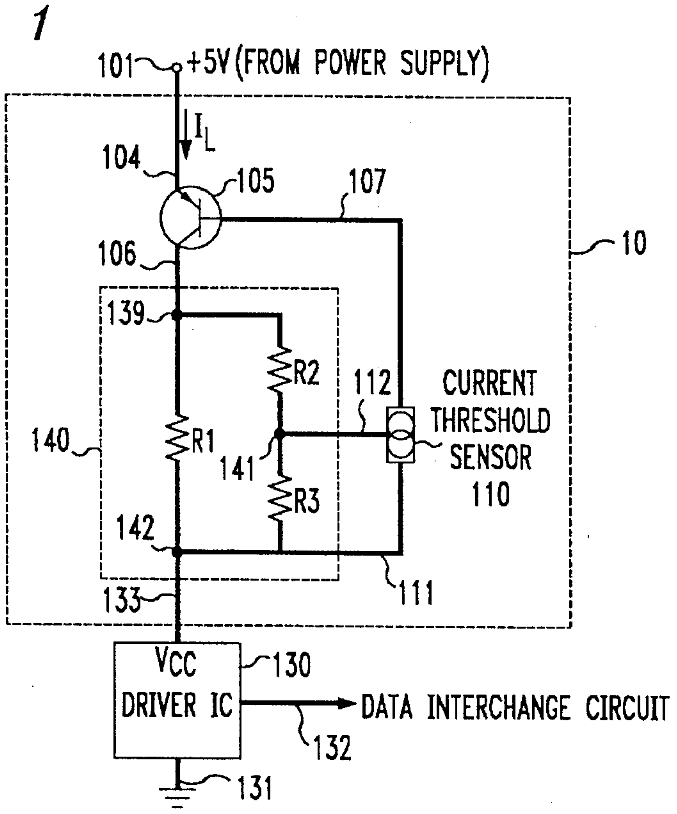
FIG. 1 shows an illustrative circuit schematic of the inventive concept.

Before describing different embodiments of the inventive concept, reference should be made to FIG. 1, which shows an illustrative basic form of the inventive concept as used within a DCE. In accordance with this inventive concept, current limiting circuit 10 couples a positive voltage, +5 V, from a power source (not shown) to a $V_{CC}$ power input pin 133 of driver IC 130. The latter provides a portion of a data interchange circuit as represented by line 132. Other than the inventive concept, current limiting circuit 10 functions as known in the art and includes both active and passive components. In particular, current limiting circuit 10 includes transistor 105, current threshold sensor 110, and resistor network 140. The specific circuit arrangement is described as follows.

Terminal 101 couples the +5 V to the emitter of transistor 105, which is shown in a "series-pass" configuration. The base of transistor 105 is coupled to driver IC 130 through current threshold sensor 110. The collector of transistor 105 is coupled to driver IC 130 through resistor network 140. The latter comprises resistors R1, R2, and R3, and terminals 139, 141, and 142. From FIG. 1, it can be observed that resistor R1 is in parallel with the series combination of resistors R2 and R3. In particular, resistor R1 is coupled to terminal 139 and terminal 142; resistor R2 is coupled to terminal 139 and terminal 141; and resistor R3 is coupled to terminal 141 and terminal 142. In addition, current threshold sensor 110 is coupled to terminal 141 and driver IC 130 is coupled to terminal 142.

The bulk of any load current, $I_L$, drawn from the power source flows through transistor 105 and resistor R1 to driver IC 130. The function of resistors R2 and R3 is to match the desired current-limit with the input threshold of current sensing device 110. In particular, the signal voltage developed across R3 controls the operation of current threshold sensor 110. At saturation, the collector-emitter voltage of transistor 105 is approximately 0.2 to 0.3 volts. The resistor values of resistor network 140 are chosen so that once the current threshold is reached—as represented by the signal voltage across R3—current threshold sensor 110 begins to inhibit, or limit, the current through the base of transistor 105 to maintain the load current at the prescribed maximum level. These resistor values are selected as follows: first, the combined value of R1, R2, and R3 is chosen to limit the drop across the resistor network to approximately 0.1 volt at the maximum current that the regulator is designed to allow. Second, R1, and the sum of R2 and R3 are chosen such that 90% of the current flows through R1. Third, R3 is chosen such that the sensing threshold of approximately 60 mv is achieved at the desired maximum current through the resistor network. A typical voltage drop across R3 that triggers a current limiting device is on the order of 60 milli-volts.

As a result, current limiting circuit 10 has two modes of operation—a "normal mode" and an "abnormal mode." During the normal mode, the voltage drop across current limiting circuit 10 is no more than +0.4 volts, and the voltage received by driver IC 130 is equal to 4.6 V, which is typically within the required power supply voltage range of most commercially-available driver ICs. In this normal mode, current limiter 210 has not yet begun to limit the current through transistor 105. In comparison, the abnormal mode of operation is triggered by the sensing threshold voltage reaching the illustrative value of 60 milli-volts, which occurs, for example, when an output lead has been shorted to ground. In response to this value of the sensing threshold voltage, current limiter 210 begins to limit, i.e., turn-off, transistor 105. As a result, the voltage drop across the collector-emitter of transistor 105, and concomitantly the voltage across current limiting circuit 10, exceeds +0.4 volts. Consequently, and in accordance with the inventive concept, a current regulator, which is configured as a current limiter, can be used in combination with a driver IC and provide robust protection against external shorts without having to alter the power source of the DCE to provide either a significantly higher voltage or current rating during normal operation.

Figure 2:
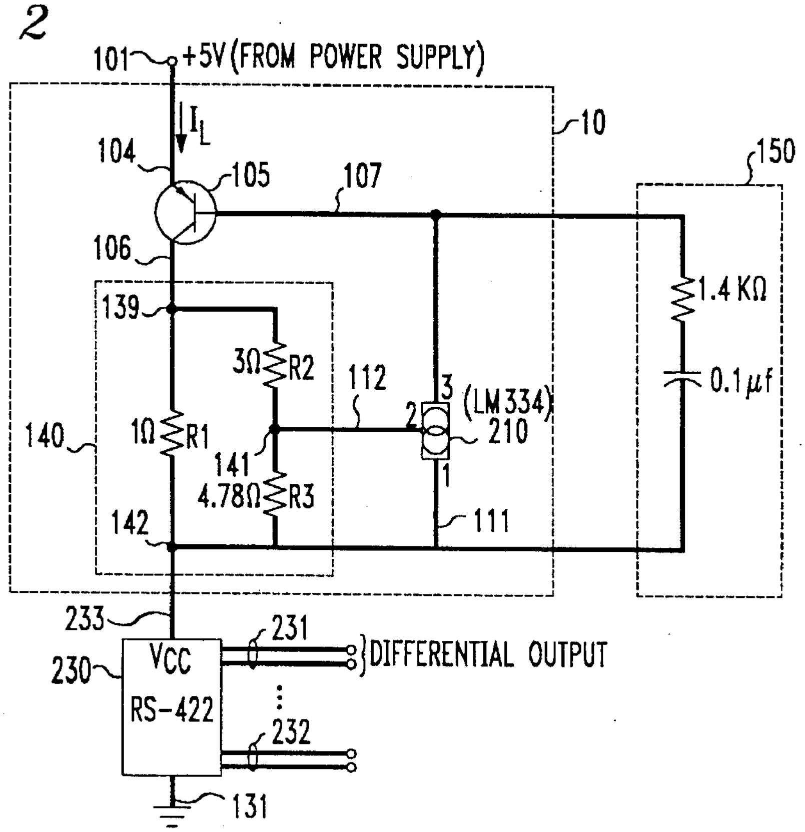
FIG. 2 shows an illustrative circuit schematic of an embodiment of the invention in which an RS-422 differential driver is supplied with power through a series-current regulator.

Turning to FIG. 2, an illustrative embodiment is shown in conjunction with driver IC 230, which provides a portion of a data interchange circuit that conforms to RS-422. FIG. 2 is similar to FIG. 1 described above except for the addition of driver IC 230 in place of driver IC 130 and the addition of network 150. The latter provides stability and is recommended by the manufacturer of current regulator 210, which is illustratively an LM 334 from National Semiconductor Inc. Pins 1 and 2 of current regulator 210 are the sensing inputs to receive the sensing voltage, while pin 3 provides an output signal that is limited by virtue of the sensing signal. Driver IC 230 provides pairs of differential output signals as represented by pairs 231 and 232. Like FIG. 1, this embodiment uses the current-sensing circuit serially between the +5 V source and pin 233 of driver IC 230. This application serves to protect differential interface leads from shorts to ground and shorts between differential outputs on single-supply drivers. Although illustrated in the context of a driver IC that provides differential outputs, the circuitry is also applicable to driver ICs that provide single-ended outputs except as noted below.

Figure 3:
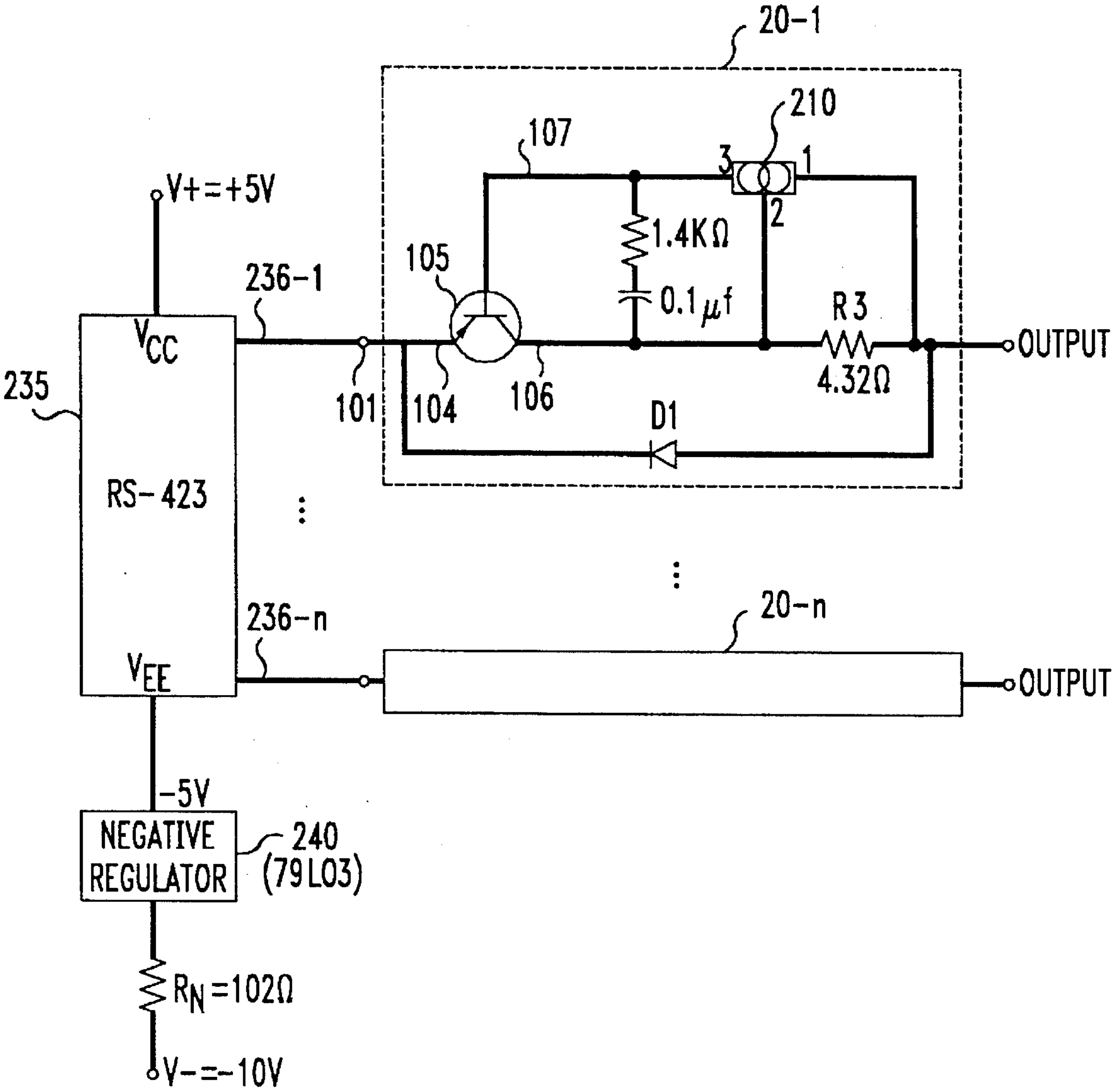
FIG. 3 shows an illustrative circuit schematic of another embodiment of the invention in which a single-ended RS-423 driver employs a series regulator on individual output leads to limit positive supply current.

As mentioned above, the voltage drop across current limiting circuit 10 is less than 0.5 volts and more typically on the order of 0.4 volts. This allows direct use of a +5 volt power source (supply or regulator output). Unfortunately, some commercially-available driver ICs cannot tolerate a variance in their +5 volt supply pin of 0.4 volts or more. Consequently, the embodiment of FIG. 2 will not work with these driver ICs. Therefore, another embodiment of the inventive concept is shown in FIG. 3. In FIG. 3, current limiting circuit is serially placed on each output lead of driver IC 235. The latter provides a number of single-ended, bi-polar, drivers, which provide output signals on lines 236-1 through 236-n. In this example, a respective current limiting circuit. as represented by current limiting circuits 20-1 and 20-n, directly protects each output driver from a short to ground. Only current limiting circuit 20-1 is shown for simplicity. Current limiting circuit 20-1 functions in a similar fashion to current limiting circuit 10, as described above. In this particular embodiment, each driver of driver IC 235 is individually regulated rather than the entire driver IC, as shown in FIG. 2. Consequently, the current to be regulated is lower and only R3 is used to develop the sensing signal for current regulator 210. In this embodiment, resistors R1 and R2 are not needed. The serial resistor/capacitor combination of FIG. 3 is, again, provided for stability as recommended by the manufacturer.

As noted earlier, driver IC 235 provides a bipolar signal. From FIG. 3, it can be observed that this embodiment uses a current-limiting circuit only for positive voltage excursions of a bipolar driver output. However, the current limiting circuit is adaptable to both positive and negative output polarities. In particular, when driver IC 235 provides a negative voltage on line 236, diode D1 causes any signal to bypass the current limiting circuit 20.

Since the output signal is bipolar from driver IC 235, there is also a problem with the negative power supply if an external Short should occur. Typically in the design of a DCE, for other than the +5 volt power supply, it may be possible to utilize other supply voltages. For example, as represented in FIG. 3, there is no −5 volt supply but instead a −10 volt supply. In this case, the inventive concept is used in conjunction with the earlier described prior art approach of using a series resistor and a voltage regulator. As shown in FIG. 3, a negative regulator 240 is in series with resistor $R_N$, which is equal to 102 ohms. Resistor $R_N$ couples a negative power supply of −10 V to negative regulator 240, which is a 79L05 available from National Semiconductor Inc. In this illustration, negative regulator 240 regulates down the −10 volts to −5 volts, which is applied to the $V_{EE}$ pin of driver IC 235. As mentioned above, current is limited through the negative regulator by resistor $R_N$, which provides current limiting in accordance with the prior art approach. This satisfies any negative supply problem during an external short. Alternatively, and in accordance with the inventive concept, current limiting circuit 10 as described above can be placed on the negative supply, or an equivalent current limiting circuit can be placed on the output leads in parallel with each respective current limiting circuit for the positive voltage in place of diode D1.

As described above, combining a current regulator with a line driver provides a robust data interchange circuit that allows the power supply of a DCE to have a nominal power—yet protect against external shorts. This current regulator is external, and in addition to, the inherent current limiter that is contained within commercially-available driver ICs.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with functional building blocks, e.g., driver integrated circuits, any equivalent driver device can be used, like a driver made up of discrete circuit components. Further, although the inventive concept was illustrated with RS-422 and RS-423 drivers, the inventive concept applies to any data interchange circuit. Finally, the inventive concept may be combined with the driver circuit in a totally integrated, single-chip device.

What is claimed:

1. A circuit for providing overload protection in a data interchange circuit, the circuit comprising:

a driver device for providing an output signal; and a current limiting circuit comprising:

a transistor having a base, emitter, and collector, where the emitter receives the output signal;

a current threshold sensor coupled between the base of the transistor and a pin of the data interchange circuit; and a resistor network for a) coupling the collector of the transistor to the pin of the data interchange circuit, and b) providing a threshold input signal to the current threshold sensor.

2. The circuit of claim 1 wherein the current threshold sensor is responsive to the threshold input signal to limit the voltage drop across the current limiting circuit to no more than one-half of one volt during normal operation.

3. The circuit of claim 1 wherein the output signal is a bi-polar signal and wherein the current limiting circuit further includes a diode that is coupled between the emitter of the transistor and the pin of the data interchange circuit such that when the output signal is negative the remaining elements of the current limiting circuit are bypassed.

* * * * *